US011211694B2

(12) United States Patent
Kerselaers et al.

(10) Patent No.: US 11,211,694 B2
(45) Date of Patent: Dec. 28, 2021

(54) NEAR-FIELD WIRELESS DEVICE (71) Applicant: NXP B.V., Eindhoven (NL)

(72) Inventors: Anthony Kerselaers, Herselt (BE);
Pieter Verschueren, Langdorp (BE);
Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 146 days.

(21) Appl. No.: 16/504,562

(22) Filed: Jul. 8, 2019

(65) Prior Publication Data

US 2021/0013594 A1    Jan. 14, 2021

(51) Int. Cl.
*H01Q 9/06* (2006.01)
*H01Q 7/06* (2006.01)
*H01Q 1/38* (2006.01)
*H01Q 1/27* (2006.01)
*H01Q 1/24* (2006.01)

(52) U.S. Cl.
CPC ............. *H01Q 1/273* (2013.01); *H01Q 1/241* (2013.01); *H01Q 1/27* (2013.01); *H01Q 1/38* (2013.01); *H01Q 7/06* (2013.01); *H01Q 9/06* (2013.01)

(58) Field of Classification Search
CPC ............ H01Q 1/273; H01Q 1/27; H01Q 9/06; H01Q 7/06; H01Q 1/38; H01Q 1/241; H04B 13/005; H04B 5/0006; H04B 5/0081
USPC ........................................................ 343/718
See application file for complete search history.

(56) References Cited

U.S. PATENT DOCUMENTS

| | | | |
|---|---|---|---|
| 3,963,990 | A | 6/1976 | DiFonzo |
| 4,849,685 | A | 7/1989 | Nave |
| 5,017,878 | A | 5/1991 | Nave |
| 6,717,485 | B2 | 4/2004 | Kolb et al. |
| 7,742,614 | B2 | 6/2010 | Christensen et al. |
| 8,125,291 | B2 | 2/2012 | Wang et al. |
| 8,970,378 | B2 | 3/2015 | Deavours et al. |
| 9,106,328 | B2 | 8/2015 | Kataoka et al. |
| 9,197,986 | B1 | 11/2015 | Kerselaers et al. |
| 9,390,603 | B2 | 7/2016 | Li et al. |
| 9,577,348 | B2 | 2/2017 | Gomme et al. |
| 9,819,097 | B2 | 11/2017 | Kerselaers et al. |
| 9,866,282 | B2 | 1/2018 | Hirsch et al. |

(Continued)

FOREIGN PATENT DOCUMENTS

EP     2458674 A2    5/2012
WO   WO-2013/147823 A1   10/2013

OTHER PUBLICATIONS

U.S. Appl. No. 16/150,015; not yet published; 30 pages (filed Oct. 2, 2018).

(Continued)

*Primary Examiner* — Hai V Tran (57) ABSTRACT

One example discloses a near-field wireless device, configured to be coupled to a host conductive structure, including: an electric near-field antenna, having a first conductive antenna surface coupled to a first feed point, and a second conductive antenna surface coupled to a second feed point; wherein the first and second conductive surfaces are separated by an air-gap; wherein the first and second conductive surfaces are configured to be substantially equidistant from the host conductive structure; and wherein the first and second conductive surfaces geometrically conform to the host conductive structure.

20 Claims, 6 Drawing Sheets

(56) References Cited

U.S. PATENT DOCUMENTS

| | | | |
|---|---|---|---|
| 9,866,966 | B2 | 1/2018 | Lott |
| 9,941,981 | B2 | 4/2018 | Linnartz |
| 10,200,092 | B1 | 2/2019 | Irci et al. |
| 11,031,680 | B2* | 6/2021 | Kerselaers ............... H01Q 7/06 |
| 2010/0279734 | A1 | 11/2010 | Karkinen et al. |
| 2010/0309080 | A1 | 12/2010 | Minemura et al. |
| 2014/0177863 | A1* | 6/2014 | Parkins ................. H01Q 1/273 |
| | | | 381/74 |
| 2015/0249485 | A1 | 9/2015 | Ouyang et al. |
| 2016/0029955 | A1 | 2/2016 | Sato |
| 2017/0062913 | A1 | 3/2017 | Hirsch et al. |
| 2017/0062949 | A1* | 3/2017 | Kerselaers ............... H01Q 7/08 |
| 2017/0180844 | A1* | 6/2017 | Nanni ...................... H01Q 1/48 |
| 2017/0263376 | A1* | 9/2017 | Verschueren ........ H04B 5/0037 |
| 2017/0288731 | A1* | 10/2017 | Kerselaers ........... H04B 5/0081 |
| 2017/0324170 | A1* | 11/2017 | Kerselaers ........... H04B 5/0031 |
| 2018/0241116 | A1* | 8/2018 | Kerselaers ............... H01Q 1/44 |
| 2019/0103661 | A1 | 4/2019 | Cousins et al. |
| 2019/0296439 | A1* | 9/2019 | Kerselaers ............... H01Q 7/00 |
| 2019/0341678 | A1* | 11/2019 | Gomme ................. H01Q 21/28 |
| 2019/0363459 | A1* | 11/2019 | Geens ................. H04B 13/005 |
| 2020/0006851 | A1* | 1/2020 | Kerselaers ............. H01Q 7/005 |
| 2020/0028246 | A1 | 1/2020 | Kim |
| 2020/0083962 | A1* | 3/2020 | Gomme ............... H04B 5/0031 |
| 2020/0244315 | A1* | 7/2020 | Kerselaers ........... H04B 5/0031 |
| 2020/0328505 | A1* | 10/2020 | Kerselaers ............. H01Q 5/321 |

OTHER PUBLICATIONS

U.S. Appl. No. 16/380,303; not yet published; 32 pages (dated Apr. 10, 2019).

U.S. Appl. No. 15/972,614; 29 Pages (filed May 7, 2018).

Notice of Allowance; U.S. Appl. No. 16/380,303; 7 pages (dated Aug. 24, 2020).

Final Office Action; U.S. Appl. No. 16/150,015; 22 pages (dated Oct. 6, 2020).

Non Final Office Action; U.S. Appl. No. 16/150,015; 16 pages (dated Apr. 24, 2020).

Notice of Allowance; U.S. Appl. No. 16/150,015; 10 pages (dated Apr. 21, 2021).

Non Final Office Action; U.S. Appl. No. 16/150,015; 25 pages (dated Jan. 19, 2021).

* cited by examiner

NEAR-FIELD WIRELESS DEVICE

The present specification relates to systems, methods, apparatuses, devices, articles of manufacture and instructions for near-field wireless devices.

SUMMARY

According to an example embodiment, a near-field wireless device, configured to be coupled to a host conductive structure, comprising: an electric near-field antenna, having a first conductive antenna surface coupled to a first feed point, and a second conductive antenna surface coupled to a second feed point; wherein the first and second conductive surfaces are separated by an air-gap; wherein the first and second conductive surfaces are configured to be substantially equidistant from the host conductive structure; and wherein the first and second conductive surfaces geometrically conform to the host conductive structure.

In another example embodiment, further comprising a dielectric outer surface enclosing a set of circuitry coupled to the electric near-field antenna; wherein both of the first and second conductive surfaces are separated from the host conductive structure by the dielectric outer surface.

In another example embodiment, further comprising a dielectric outer surface enclosing a set of circuitry coupled to the electric near-field antenna; wherein the first conductive surface is separated from the host conductive structure by the dielectric outer surface and the second conductive surface is in galvanic contact with the host conductive structure.

In another example embodiment, further comprising a dielectric outer surface enclosing a set of circuitry coupled to the electric near-field antenna; wherein both of the first and second conductive surfaces are substantially centered about a longitudinal axis of the dielectric outer surface.

In another example embodiment, the first conductive surface is coupled to a first set of angular locations about the outer surface of the wireless device and the second conductive surface is coupled to a second set of angular locations about the outer surface of the wireless device; and the first and second set of angular locations do not overlap.

In another example embodiment, the first and second conductive surfaces are in a same geometric plane.

In another example embodiment, the host conductive structure is an ear; the first conductive surface is configured to be substantially proximate to an antitragus portion of the ear; and the second conductive surface is configured to be substantially proximate to a tragus portion of the ear.

In another example embodiment, the first and second conductive surfaces each have an inner surface and an outer surface; the inner surfaces substantially face each other and the outer surfaces substantially face away from each other; and the first and second conductive surfaces are configured to generate fringing fields between their outer surfaces that are coupled within the host conductive structure.

In another example embodiment, further comprising a coil antenna portion configured as a magnetic near-field antenna.

In another example embodiment, further comprising, a tuning unit coupled to the first and second conductive surfaces; a set of near-field amplifiers coupled to the tuning unit and configured to transmit and/or receive a set of near-field frequencies; wherein the tuning unit includes a set of capacitors coupled to the first and second conductive surfaces and configured to tune a resonance frequency of the near-field antenna at near-field frequencies.

In another example embodiment, further comprising a far-field antenna and a far-field ground plane together configured to transmit and receive a set of far-field frequencies; wherein the far-field ground plane is coupled to an end of each of the capacitors opposite to an end coupled to the conductive surfaces.

In another example embodiment, values for the set of capacitors are set such that they tune a resonance frequency of the near-field antenna at the set of near-field frequencies, but substantially function as a short circuit at the set of far-field frequencies.

In another example embodiment, the near-field signals are less than or equal to about 50 MHz; and the far-field signals are greater or equal to about 1 GHz.

In another example embodiment, at least one of the conductive surfaces is a spiral coil; and the spiral coil is the far-field antenna.

In another example embodiment, the far-field antenna is a monopole far-field antenna.

In another example embodiment, the far-field antenna has a length greater than or equal to ¼ wavelength of a lowest of the set of far-field frequencies.

In another example embodiment, the host conductive structure is at least one of: a human body, an ear, a wrist, or an orifice.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are on-body and off-body communication and other wireless networked devices based on near-field electromagnetic induction (NFEMI), where the transmitter and receiver are coupled by both magnetic (H) and electric (E) fields and/or far-field communication using RF plane waves propagating through free space.

On-body NFEMI communications utilize non-propagating quasi-static H and E fields. Such on-body NFEMI devices include an H-field antenna (i.e. magnetic antenna) that is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

Such on-body NFEMI devices also include an E-field antenna (i.e. electric antenna) that is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these near-fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) or near-field electric induction (NFEI) communication may also be used for such body communications. The magnetic fields in NFMI devices are not coupled to the body, and thus such devices can be farther away from the body than NFEMI or NFEI devices and still ensure communication. The NFMI device's range however is much shorter than a full body NFEI device's range due to small magnetic antenna sizes in such NFMI devices. Small antenna geometries are efficient for NFMI and NFEMI antennas since they minimize radiating waves in free space.

Wireless earbuds are example devices that can use both near-field and far-field communications modes. For example, an earbud can receive far-field audio information from a smartphone or other device. The smartphone could transmit left and right earbud audio to one or both earbuds by means of far-field communication (e.g. Bluetooth). While both earbuds could receive their audio content directly via far-field communications, this mode is not always very robust due to signal fading that occurs due to multi-path propagation.

Alternately, the smartphone could send both audio channels, left and right, using far-field signals to just one of the earbuds which then forwards the appropriate audio channel to the other earbud by means of near-field communications. This dual-mode would address the multi-path problem and can thus be more robust than just using far-field communications.

Figure 1:
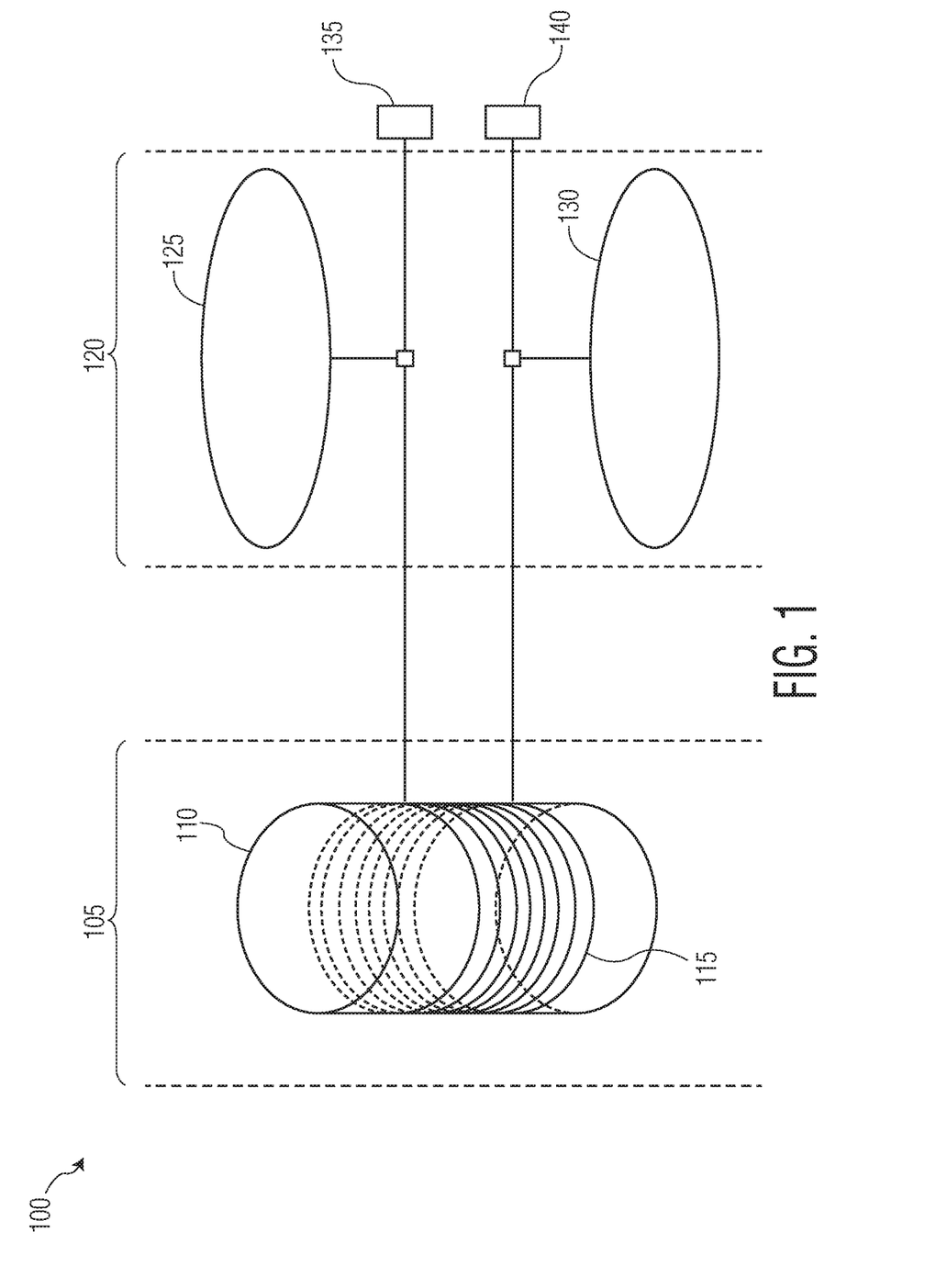
FIG. 1 is an example near-field electromagnetic induction (NFEMI) antenna.

FIG. 1 is an example near-field electromagnetic induction (NFEMI) antenna 100 for use in a near-field wireless device. The antenna 100 in this example is an electromagnetic induction (NFEMI) antenna. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include a first conductive antenna surface 125 and a second conductive antenna surface 130. Antenna 100 feed points 135, 140 are coupled to various transceiver circuitry, such as downstream radio transmitter and receiver integrated circuit (RF-IC), (not shown here). The antenna 100 bandwidth and resonance frequency can be tuned using reactance components (e.g. capacitive and resistive banks) that are integrated in the radio IC.

The short loaded dipole portion 120 is responsive to an electric (E) field. The coil antenna portion 105 is responsive to a magnetic (H) field. In some example embodiments, the coil's 105 ferrite core 110 may have a diameter of about 3 mm and a length of about 6 mm. In other example embodiments, the coil's 105 overall shape may be oval with dimensions of 2×4 mm and a length of 6 mm.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced. Commonly, near-field antennas for wearables operate at or about 10 MHz, while their far-field antennas operate at or about 2.5 GHz.

Figure 2:
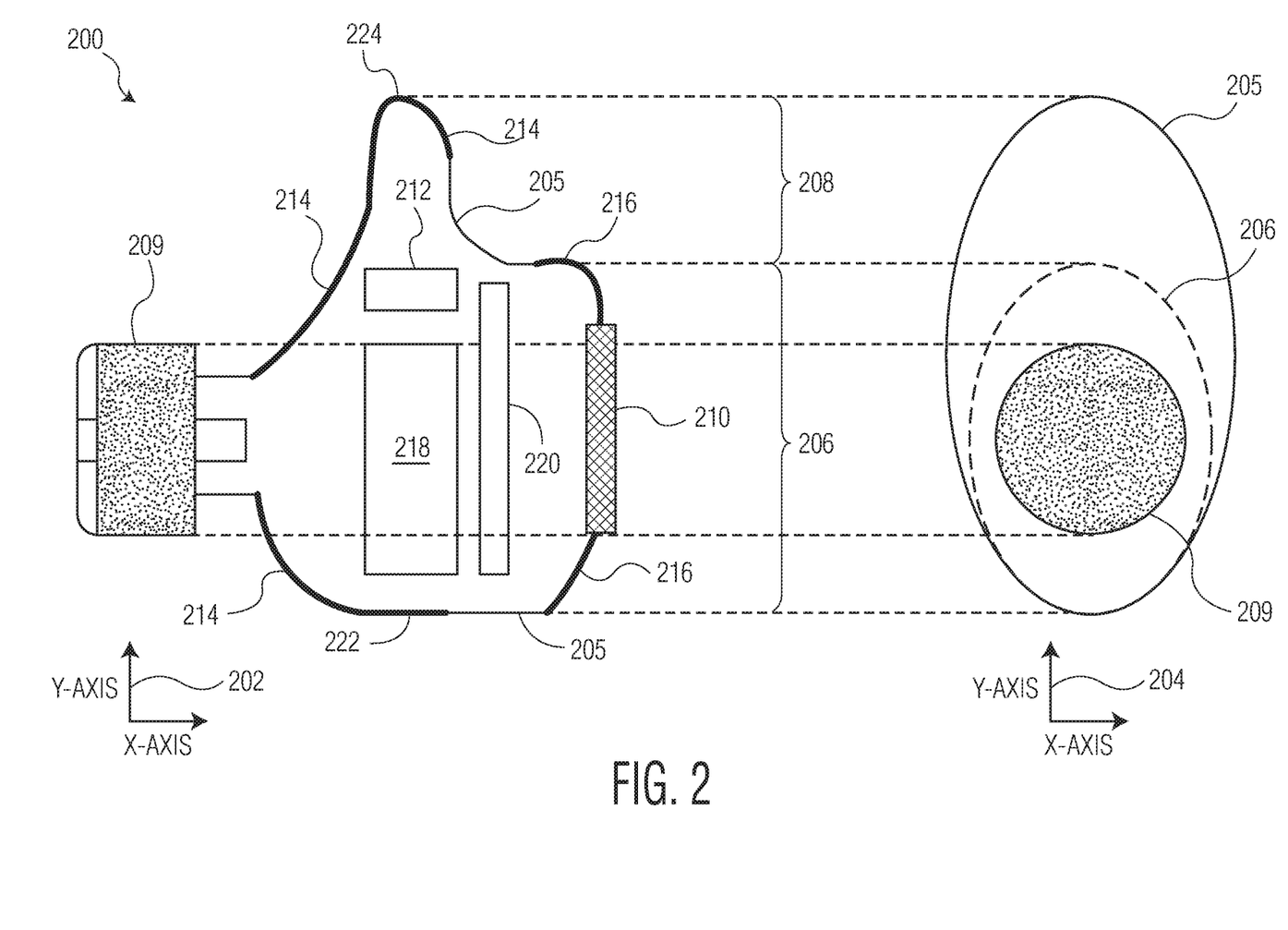
FIG. 2 shows two views of a first example near-field wireless device including an NFEMI antenna.

FIG. 2 shows two views of a first example near-field wireless device 200 including an NFEMI antenna. In this example embodiment, the wireless device 200 is an earbud that in use may be partially or completely covered, such as when in an earbud placed in a user's ear canal. An example side view 202 of the wireless device 200 and an example axial view 204 (i.e. facing a side to be inserted in an ear canal) of the wireless device 200 are shown.

The device 200 includes a non-planar outer surface 205 having a core region 206 and an extension region 208, a loudspeaker 209, a user interface 210, a coil antenna 212 (i.e. magnetic H-Field antenna), a first conductive antenna surface 214 (i.e. electric E-Field antenna), a second conductive antenna surface 216 (i.e. electric E-Field antenna), a battery 218 and electronic circuitry 220.

The core region 206 is in this example houses various functional components. The extension region 208 defines part of the non-planar outer surface 205 of the wireless device 200 and is contoured to snugly fit the non-planar surface of a host conductive surface (e.g. a user's ear, so as to provide a stable positioning of an earbud embodiment of the wireless device 200).

In some example embodiments, the loudspeaker 209 is configured to be inserted in a user's ear canal. The user interface 210 enables control of the wireless device 200 (e.g. controlling different functionalities of the earbud) and may include switches, proximity, and/or optoelectronics responsive to touch and/or gestures from a user.

Some example embodiments of the coil antenna 212 include a core and wire windings, where the core is a ferrite material with dimensions of 2 mm diameter and 6 mm length) and there are at least 20 wire windings.

In some example embodiments, the first conductive antenna surface 214 includes a lower portion 222 inside of the wireless device 200 near the battery and an upper portion 224 that is closer to the outer surface of the wireless device 200. The second conductive antenna surface 216 in some examples encircles the user interface 210, while in other examples may have a planar portions that continues on behind or in front of the user interface 210. In some example embodiments the first and second conductive antenna surfaces 214, 216 are flexible metal foils, in other example embodiments the first and second conductive antenna surfaces 214, 216 are conductive paints.

The battery 218 supplies power to the electronic circuitry 220, and may be chargeable or replaceable. The electronic circuitry 220 in various example embodiments includes transceiver circuitry, a receiver integrated circuit (RF-IC), and reactance components (e.g. capacitive and resistive banks). The reactance components (e.g. capacitive and resistive banks) adjust a bandwidth and resonance frequency of the device 200. The electronic circuitry 220 may be coupled to a substrate/carrier. The carrier may be a printed circuit board or any flexible material suitable to hold the electronic circuitry 220 and any mechanic components enabling the functioning of the earbud.

A voltage transmitted and/or received by the NFEMI antenna of the wireless device 200 is a combination of voltages due to both the magnetic H-Field and the electric E-Field.

In this first example wireless device 200, the received signal strength (i.e. Vrx) from the electric field will be increased when a distance (d) increases between the first conductive antenna surface 214 and the second conductive antenna surface 216. Also in this first example wireless device 200, only the first conductive antenna surface 214 is close to the conductive host surface (e.g. a user's ear-canal) while the second conductive antenna surface 216 is placed as far away from the conductive host surface as possible.

The first example wireless device 200 here is an example body-wearable device (e.g. an earbud). While only near-field antennas 212, 214, 216 and circuitry 220 are shown in FIG. 2, the first example wireless device's 200 formfactor is sufficiently large for a far-field antenna (not shown) and circuitry to be added if needed (e.g. the body-wearable device needs both near-field to communicate on-body and far-field to communicate off-body.

However, earbud formfactors are under pressure to shrink and not grow or remain unchanging.

Now discussed are example embodiments of wireless devices and/or body-wearable devices that either function with a much smaller near-field antenna or combine both near-field and far-field antennas into a smaller formfactor. In various example embodiments, the combined near-field and far-field antennas and circuitry can be further reduced in size by reusing parts of the near-field antenna for far-field communications such that either no or minimal extra volume is required so that both antennas fit into the formfactor of a small earbud.

Example embodiments of such a combination/dual-mode antenna, can include a first mode for near-field audio and data communication and a second mode for far-field communication (e.g. Bluetooth, BLE, etc.). Such a combination antenna permits both on-body and off-body wireless communication of audio, video, and data.

Figure 3:
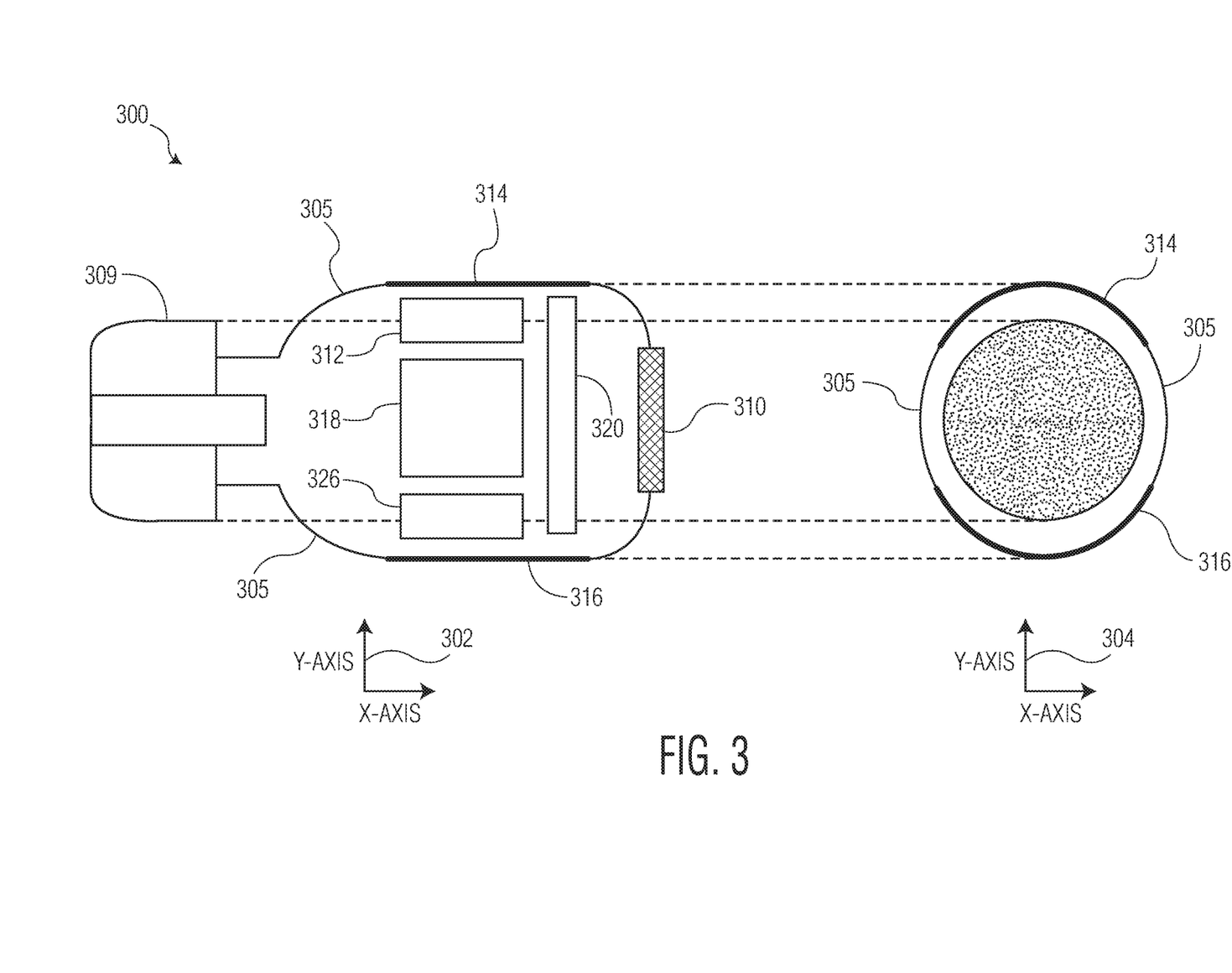
FIG. 3 shows two views of a second example near-field wireless device 300 including both far-field and near-field antennas.

FIG. 3 shows two views of a second example near-field wireless device 300 including both far-field and near-field antennas. In this example embodiment, the wireless device 300 was originally a far-field only earbud having a much smaller formfactor than the first example wireless device 200 shown in FIG. 2. A different near-field antenna has been constructed to function in this smaller formfactor, as is discussed below.

When in use, the second example wireless device 300 may be partially or completely covered, such as when in an earbud placed in a user's ear canal. An example side view 302 of the wireless device 300 and an example axial view 304 (i.e. facing a side to be inserted in an ear canal) of the wireless device 300 are shown.

The device 300 includes a non-planar outer surface 305, a loudspeaker 309, a user interface 310, a coil antenna 312 (i.e. magnetic H-Field antenna), a first conductive antenna surface 314 (i.e. electric E-Field antenna), a second conductive antenna surface 316 (i.e. electric E-Field antenna), a battery 318, electronic circuitry 320, and a far-field antenna 326.

The non-planar outer surface 305 houses various functional components and is contoured to snugly fit the non-planar surface of a host conductive surface (not shown) such as a user's ear, so as to provide a stable positioning of an earbud embodiment of the wireless device 300.

In some example embodiments, the loudspeaker 309 is configured to be inserted in a user's ear canal. The user interface 310 enables control of the wireless device 300 (e.g. controlling different functionalities of the earbud) and may include switches, proximity, and/or optoelectronics responsive to touch and/or gestures from a user.

Some example embodiments of the coil antenna 312 include a core and wire windings, where the core is a ferrite material with dimensions of 2 mm diameter and 6 mm length) and there are at least 20 wire windings.

The first conductive antenna surface 314 and second conductive antenna surface 316 are shown partially encircling the non-planar outer surface 305 so as to be substantially equidistant from (i.e. either proximate to and/or in galvanic contact with) the host conductive structure. Substantially equidistant is herein defined to include example embodiments where one or more of the surfaces 314, 316 are inside of the outer surface 305, such that the outer surface 305 forms a dielectric between the surface(s) 314 and/or 316 and the host structure, or example embodiments where one or more of the surfaces 314, 316 are outside of the outer surface 305, such that the surface(s) 314 and/or 316 are in galvanic contact with the host structure.

In some example embodiments the first and second conductive antenna surfaces 314, 316 are flexible metal foils, in other example embodiments the first and second conductive antenna surfaces 314, 316 are conductive paints.

The battery 318 supplies power to the electronic circuitry 320, and may be chargeable or replaceable. The electronic circuitry 320 in various example embodiments includes transceiver circuitry, a receiver integrated circuit (RF-IC), and reactance components (e.g. capacitive and resistive banks) for both near-field and far-field antennas. The reactance components (e.g. capacitive and resistive banks) adjust a bandwidth and resonance frequency of the device 300. The electronic circuitry 320 may be coupled to a substrate/carrier. The carrier may be a printed circuit board or any flexible material suitable to hold the electronic circuitry 320 and any mechanic components enabling the functioning of the earbud.

A voltage transmitted and/or received by the NFEMI antenna of the wireless device 300 is a combination of voltages due to both the magnetic H-Field and the electric E-Field.

In this second example wireless device 300, both the first and second conductive antenna surfaces 314, 316 are close to (e.g. proximate to) and/or touching (e.g. in galvanic contact with) the conductive host surface (e.g. a user's ear-canal).

The second example wireless device 300 here is an example body-wearable device (e.g. an earbud). While only near-field antennas 312, 314, 316 and circuitry 320 are shown in FIG. 3, the second example wireless device's 300 formfactor is sufficiently large for a far-field antenna (not shown) and circuitry to be added if needed (e.g. the body-wearable device needs both near-field to communicate on-body and far-field to communicate off-body).

Figure 4:
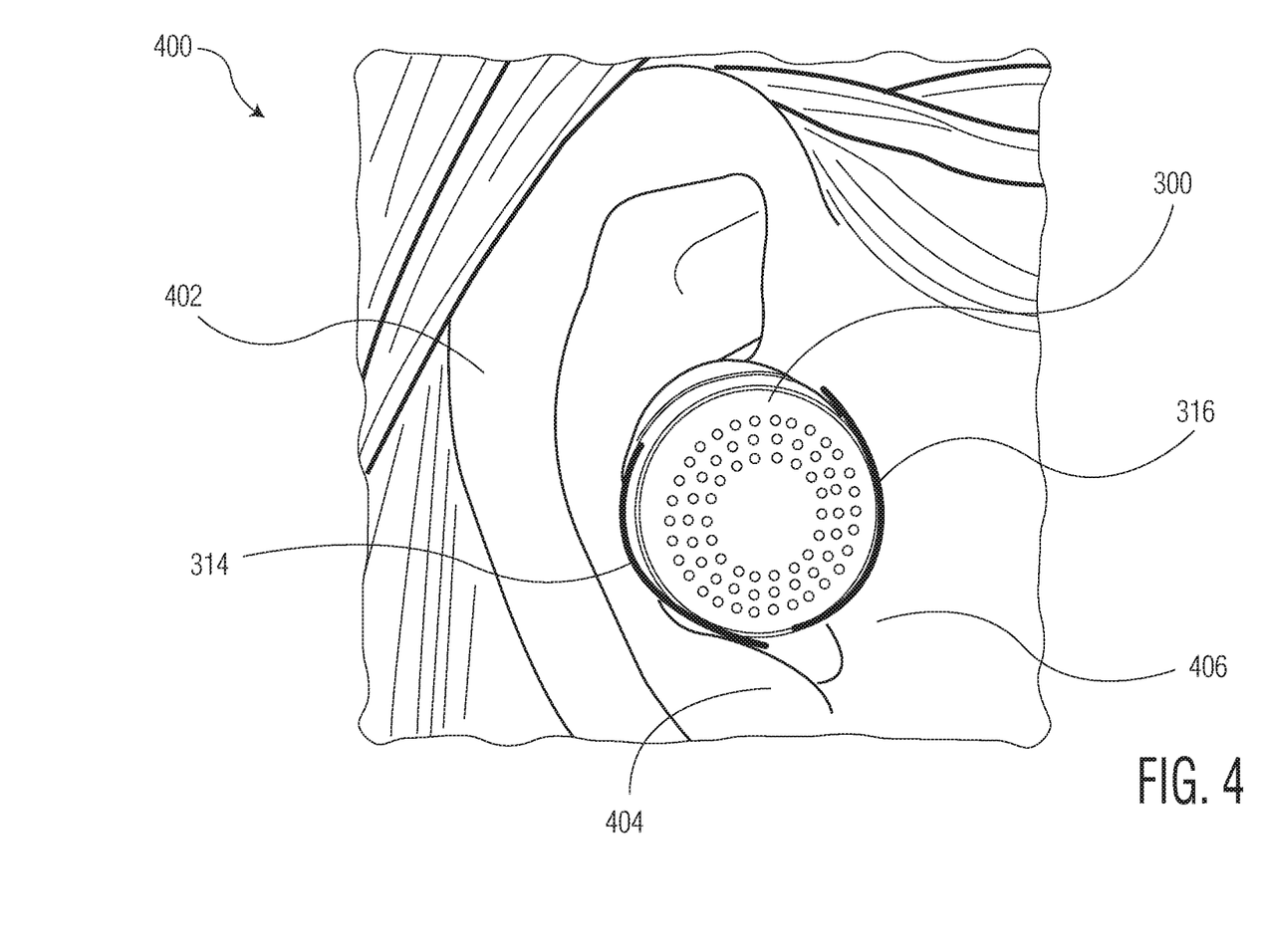
FIG. 4 shows an example application of the second example wireless device.

FIG. 4 shows an example application 400 of the second example wireless device 300. This example application 400 shows a host conductive structure 402 (e.g. ear of a user), the second example wireless device 300 (e.g. earbud), the first conductive antenna surface 314 (E-Field), the second conductive antenna surface 316 (E-Field), an antitragus 404 portion of the ear 402, and a tragus 406 portion of the ear 402.

The earbud 300 (i.e. wireless device) can include near-field and/or far-field antennas, a tuning unit, near-field and far-field TX/RX amplifiers, and a user interface.

Note that both the first conductive antenna surface 314 (E-Field) and the second conductive antenna surface 316 (E-Field) are positioned either proximate to (e.g. just inside the non-planar outer surface 305 (acts as a dielectric) of the second example wireless device 300) and/or in galvanic contact with (e.g. outside the non-planar outer surface 305 of the second example wireless device 300) the host conductive structure 402 (e.g. ear of a user). The operational effect of such positioning is discussed further in FIG. 5.

Both the first conductive antenna surface 314 (E-Field) and the second conductive antenna surface 316 (E-Field) are in this example embodiment positioned substantially a same distance away from the host conductive structure 402 as well.

Figure 5:
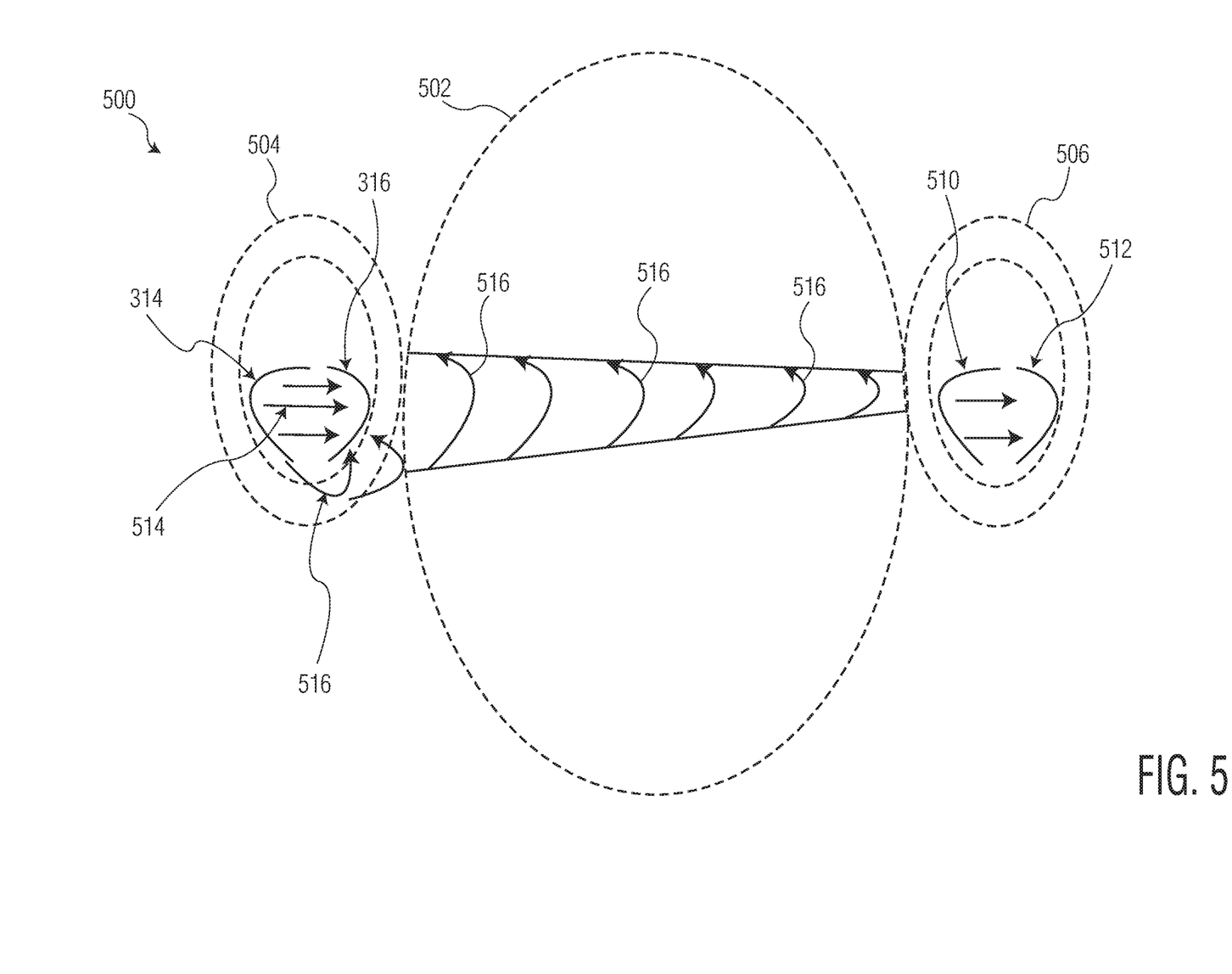
FIG. 5 shows an example operation of the second example wireless device.

As is further discussed in FIG. 5, an inside electric field is formed between inside surfaces of the first and second conductive surfaces 314, 316, and an outside electric field is formed between outside surfaces of the first and second conductive surfaces 314, 316. While the inside electric field is substantially confined to between the conductive surfaces 314, 316, the outside (e.g. fringing) electric field can be conducted/distributed by the host structure 402 to other near-field wireless devices proximate to and/or in galvanic contact with the host structure 402.

Thus a closer the conductive surfaces 314, 316 are to the host conductive structure 402 (e.g. ear of a user), a greater the outside electric field that is generated in transmit mode and thus resulting in an increase received voltage in receive mode by other near-field wireless devices. Note that any distance between the conductive surfaces 314, 316 and the host conductive structure 402 forms a capacitor that is in series with the capacitance formed between both conductive surfaces 314, 316.

The capacitor formed by either of the conductive surfaces 314, 316 and the host conductive structure 402 is inversely related to the distance between surfaces (one conductive surface and the ear tissue), and this distance should be as small as possible.

In some example embodiments the first conductive surface 314 is close to or against to the antitragus 404 and the second conductive surface 316 is close to or against to the tragus 406. The conductive surfaces 314, 316 can have any shape that fits a corresponding surface of the host conductive structure 402 (e.g. the ear canal). The conductive surfaces 314, 316 can also be very thin (e.g. 0.1 mm thick) and require almost no volume. In various example embodiments, the earbud 300 also includes a far field antenna and corresponding communications circuitry (e.g. see FIG. 6).

FIG. 5 shows an example operation 500 of the second example wireless device 300. Shown in this example 500 is a host structure 502 (e.g. human head) having a first ear 504 and a second ear 506. The second example wireless device 300 (i.e. a first earbud), having the first conductive antenna surface 314 (E-Field) and the second conductive antenna surface 316 (E-Field), is positioned in the first ear 504.

A third example wireless device (not numbered) (i.e. a second earbud), having a first conductive antenna surface 510 (E-Field) and a second conductive antenna surface 512 (E-Field), is positioned in the second ear 506.

An inside electric field 514 is formed between inside surfaces of the first and second conductive surfaces 314, 316, and an outside electric field 516 is formed between outside surfaces of the first and second conductive surfaces 314, 316. The inside surfaces substantially face each other and the outside surfaces substantially face away from each other.

When the first earbud 300 in ear 504 is in transmit mode, a near-field signal (e.g. a low frequency, perhaps below 50 MHz) is applied to the conductive surfaces 314, 316 resulting in both the inside electric field 514 and the outside electric field 516. While the inside electric field 514 does not really couple to the earbud in the second ear 506, the outside electric field 516 does.

The outside electric field 516 in many applications is called a fringing field and is undesired (e.g. in capacitor design fringing fields are considered parasitic); however, near-field signals generated by the second example wireless device 300 are actually enabled by this fringing field propagating through the host conductive structure 502 (e.g. human head) which has a higher dielectric constant than the earbud and thus results in a higher near-field signal strength passed to the second earbud (e.g. the third example wireless device).

The second earbud in ear 506 is in receive mode and its conductive surfaces 510, 512 convert the received outside electric field 516 into a received near-field signal. It is found that this outside electric field 516 can be used to communicate streaming audio with low latency from one ear to the other.

Additionally, since most of the outside electric field 516 is concentrated in the host conductive structure 502 (e.g. at the skin level) the outside electric field 516 is also relatively insensitive to external interference by other near-field signals (e.g. NFEI, NFMI, NFEMI) received by and following an outer-surface of the host conductive structure 502. The outside electric field 516 E-field signal is thus kept within the host conductive structure 502 (e.g. the body) and is less affected by "environmental E-field noise".

For example, a transmitter positioned in a first ear with a voltage level of 2.5 Vrms and connected to two conductive surfaces of 12 mm2, generates an electric field that can be received with a signal strength of 48 dbμV at a second ear having a similar antenna. During audio streaming listening tests in harsh environments is found that the communication is not disturbed by interferences.

Figure 6:
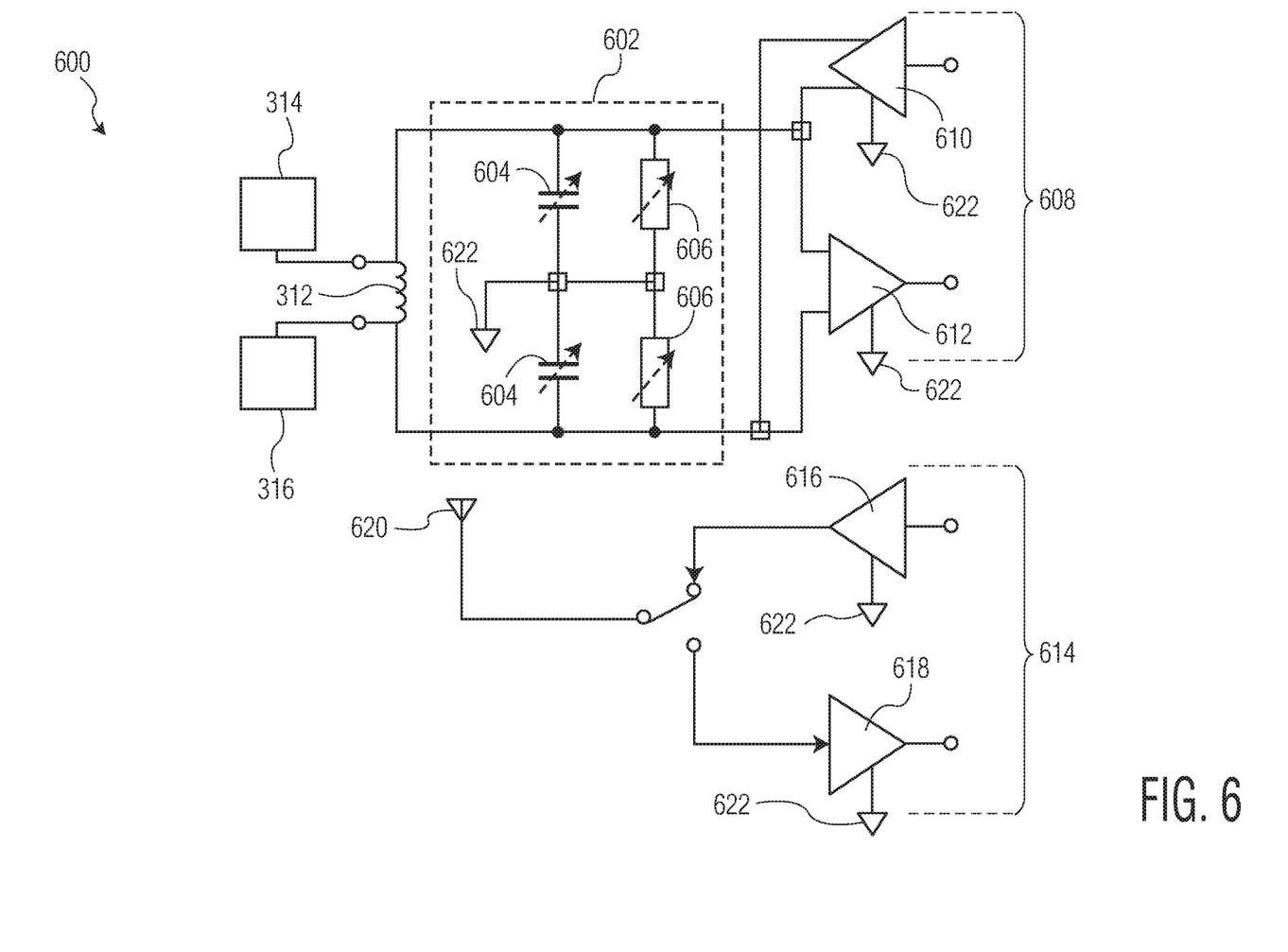
FIG. 6 is an example idealized electrical diagram of the second example wireless device.

FIG. 6 is an example idealized electrical diagram 600 of the second example wireless device 300. The example 600 shows the first conductive antenna surface 314 (E-Field), the second conductive antenna surface 316 (E-Field), a tuning circuit 602 having a capacitive bank 604 for resonance frequency tuning, a resistive bank 606 for bandwidth tuning, a set of near-field amplifiers 608 (a transmitter amplifier 610 and a receiver amplifier 612), a set of far-field amplifiers 614 (a transmitter amplifier 616 and a receiver amplifier 618), a far-field antenna 620, and a ground plane 622.

The conductive surfaces 314, 316 are connected to the tuning circuit 602 which is coupled to the near-field amplifiers 608. The electric antenna forms a capacitance and is tuned to the near-field communication frequency by means of the coil antenna 312 (H-Field) and the capacitive bank 604. The near-field communication bandwidth is tuned by means of the resistive bank 606. The tuning is dynamic and can adapt continuously for changes in the near-field antenna during the use of the second example wireless device 300 (e.g. the earbud).

The near-field receiver amplifier 612 (low noise amplifier) and the near-field transmitter amplifier 610 have relatively high input and output impedance. Both impedances are not necessarily the same in value. The near-field amplifiers 608 are matched to the required communication bandwidth by means of the resistive bank 606, thus the values of the resistive bank 606 may be different in receive mode from that in transmit mode.

In some example embodiments, the second example wireless device 300 also includes a far-field antenna 620 and far-field amplifiers 614, the values for the capacitors in the capacitive bank 604 of the tuning circuit 602 are set such that at near-field frequencies (e.g. below 50 MHz) the capacitive bank 604 is still able to tune the near-field resonance frequency.

However, the capacitors in the capacitive bank 604 are also set such that at far-field frequencies (e.g. above 2.45 GHz) the capacitive bank 604 has a very low or negligible impedance and can be approximated as a short-circuit (e.g. if the capacitors in the capacitive bank 604 have values of about 60 picoF, then the impedance at far-field frequencies (e.g. 2.45 GHz) would be only 1.08 ohms). Thus at such a low impedance, the conductive surfaces 314, 316 would effectively be galvanically coupled to the ground plane 622.

Also at RF frequencies the impedance of the coil 312 is very high and can be approximated as an open-circuit (e.g. a typical value of the coil is 3.8 uH, creating an impedance of 4860 ohms at 2.45 GHz).

Such a particular tuning circuit 602 arrangement enables the conductive surfaces 314, 316 to function as an electric antenna for near-field communications, while functioning as a ground plane for far-field communications. This effective increase in the size of the ground plane 622 improves the robustness and efficiency of the far-field antenna without any additional volume that is required.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field wireless device, configured to couple to a host conductive structure, comprising:
   wherein the device includes a first end and a second end;
   wherein the first end and second end define a longitudinal axis of the device;
   an electric near-field antenna, having a first conductive antenna surface coupled to a first feed point, and a second conductive antenna surface coupled to a second feed point;
   wherein the first and second conductive surfaces are each formed in parallel along the longitudinal axis of the device;

wherein the first and second conductive surfaces are separated by a physical distance; and wherein the first and second conductive surfaces are configured to couple to the host conductive structure along the longitudinal axis.

2. The device of claim 1:

further comprising a dielectric outer surface enclosing a set of circuitry coupled to the electric near-field antenna;

wherein both of the first and second conductive surfaces are separated from the host conductive structure by the dielectric outer surface.

3. The device of claim 1:

further comprising a dielectric outer surface enclosing a set of circuitry coupled to the electric near-field antenna;

wherein the first conductive surface is separated from the host conductive structure by the dielectric outer surface and the second conductive surface is in galvanic contact with the host conductive structure.

4. The device of claim 1:

further comprising a dielectric outer surface enclosing a set of circuitry coupled to the electric near-field antenna;

wherein both of the first and second conductive surfaces are substantially centered about the longitudinal axis of the near-field wireless device.

5. The device of claim 1:

wherein the first and second conductive surfaces are in a same geometric plane.

6. The device of claim 1:

wherein the host conductive structure is an ear;

wherein the first conductive surface is configured to be worn near an antitragus portion of the ear; and wherein the second conductive surface is configured to be worn near a tragus portion of the ear.

7. The device of claim 1:

wherein the first and second conductive surfaces each have an inner surface and an outer surface;

wherein the inner surfaces substantially face each other and the outer surfaces substantially face away from each other; and wherein the first and second conductive surfaces are configured to generate fringing fields between their outer surfaces that are coupled within the host conductive structure.

8. The device of claim 1:

further comprising a coil antenna portion configured as a magnetic near-field antenna.

9. The device of claim 1:

further comprising, a tuning unit coupled to the first and second conductive surfaces;

a set of near-field amplifiers coupled to the tuning unit and configured to transmit and/or receive a set of near-field frequencies;

wherein the tuning unit includes a set of capacitors coupled to the first and second conductive surfaces and configured to tune a resonance frequency of the near-field antenna at near-field frequencies.

10. The device of claim 9:

further comprising a far-field antenna and a far-field ground plane together configured to transmit and receive a set of far-field frequencies;

wherein the far-field ground plane is coupled to an end of each of the capacitors opposite to an end coupled to the conductive surfaces.

11. The device of claim 10:

wherein values for the set of capacitors are set such that they tune a resonance frequency of the near-field antenna at the set of near-field frequencies, but substantially function as a short circuit at the set of far-field frequencies.

12. The device of claim 11:

wherein the near-field signals are less than or equal to about 50 MHz; and wherein the far-field signals are greater or equal to about 1 GHz.

13. The device of claim 10:

wherein at least one of the conductive surfaces is a spiral coil; and wherein the spiral coil is the far-field antenna.

14. The device of claim 10:

wherein the far-field antenna is a monopole far-field antenna.

15. The device of claim 10:

wherein the far-field antenna has a length greater than or equal to ¼ wavelength of a lowest of the set of far-field frequencies.

16. The device of claim 1:

wherein the host conductive structure is at least one of: a human body, an ear, a wrist, or an orifice.

17. The device of claim 1:

wherein the physical distance separates the first and second conductive surfaces along the longitudinal axis of the device.

18. The device of claim 1:

wherein the first and second conductive surfaces are configured to be surrounded by the host conductive structure; and wherein the first and second conductive surfaces are both configured to be substantially equidistant from the host conductive structure.

19. A near-field wireless device, configured to couple to a host conductive structure, comprising:

an electric near-field antenna, having a first conductive antenna surface coupled to a first feed point, and a second conductive antenna surface coupled to a second feed point;

wherein the first and second conductive surfaces are separated by an air-gap;

wherein the first and second conductive surfaces are substantially equidistant from the host conductive structure; and wherein the first and second conductive surfaces geometrically conform to the host conductive structure;

further comprising a dielectric outer surface enclosing a set of circuitry coupled to the electric near-field antenna;

wherein the first conductive surface is separated from the host conductive structure by the dielectric outer surface and the second conductive surface is in galvanic contact with the host conductive structure.

20. A near-field wireless device, configured to couple to a host conductive structure, comprising:

an electric near-field antenna, having a first conductive antenna surface coupled to a first feed point, and a second conductive antenna surface coupled to a second feed point;

wherein the first and second conductive surfaces are separated by an air-gap;

wherein the first and second conductive surfaces are substantially equidistant from the host conductive structure;

wherein the first and second conductive surfaces geometrically conform to the host conductive structure;
a tuning unit coupled to the first and second conductive surfaces;
a set of near-field amplifiers coupled to the tuning unit and configured to transmit and/or receive a set of near-field frequencies;
wherein the tuning unit includes a set of capacitors coupled to the first and second conductive surfaces and configured to tune a resonance frequency of the near-field antenna at near-field frequencies; and
a far-field antenna and a far-field ground plane together configured to transmit and receive a set of far-field frequencies;
wherein the far-field ground plane is coupled to an end of each of the capacitors opposite to an end coupled to the conductive surfaces.

* * * * *